United States Patent
Barone et al.

(10) Patent No.: US 11,215,279 B2
(45) Date of Patent: Jan. 4, 2022

(54) METHOD TO AUTOMATICALLY CONTROL A DRIVETRAIN PROVIDED WITH A SERVO-ASSISTED TRANSMISSION

(71) Applicant: FERRARI S.p.A., Modena (IT)

(72) Inventors: Alessandro Barone, Bologna (IT);
Andrea Nannini, Modena (IT);
Giacomo Senserini, Modena (IT);
Stefano Marconi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/017,242

(22) Filed: Sep. 10, 2020

(65) Prior Publication Data
US 2021/0095760 A1    Apr. 1, 2021

(30) Foreign Application Priority Data

Sep. 30, 2019   (IT) .................. 102019000017519

(51) Int. Cl.
*F16H 59/36* (2006.01)
*F16H 59/48* (2006.01)
*F16H 61/02* (2006.01)
*F16H 59/22* (2006.01)
*F16H 59/54* (2006.01)

(52) U.S. Cl.
CPC ......... *F16H 61/0213* (2013.01); *F16H 59/22* (2013.01); *F16H 59/36* (2013.01); *F16H 59/54* (2013.01); *F16H 2059/366* (2013.01)

(58) Field of Classification Search
CPC ..... F16H 59/36; F16H 59/48; F16H 2059/366
See application file for complete search history.

(56) References Cited

U.S. PATENT DOCUMENTS

| | | | |
|---|---|---|---|
| 8,406,968 B2 | 3/2013 | Huber et al. | |
| 8,909,445 B2 * | 12/2014 | Swartling | F16H 61/0213 701/66 |
| 10,190,684 B2 | 1/2019 | Vu et al. | |
| 2019/0249768 A1 | 8/2019 | Kishi | |

FOREIGN PATENT DOCUMENTS

JP    4515592 B2 *    8/2010    ............ B60W 10/02

OTHER PUBLICATIONS

Search Report in Italian Patent Application No. 201900017519, date of completion Mar. 27, 2020; 8 pages.

* cited by examiner

*Primary Examiner* — Tisha D Lewis
(74) *Attorney, Agent, or Firm* — Cantor Colburn LLP

(57) ABSTRACT

A method to automatically control a drivetrain provided with a servo-assisted transmission; the method presents the steps of: measuring a rotation speed of the internal combustion engine; carrying out a downshift to a lower gear in an autonomous manner, when the rotation speed of the internal combustion engine reaches a lower threshold; carrying out an upshift to a higher gear in an autonomous manner, when the rotation speed of the internal combustion engine reaches an upper threshold; detecting a release of an accelerator pedal in a first instant; waiting, starting from the first instant, a time interval until a second instant, which is subsequent to the first instant; and increasing a value of the lower threshold starting from the second instant until a following pressing of the accelerator pedal, if in the second instant the rotation speed of the internal combustion engine still exceeds the lower threshold.

10 Claims, 4 Drawing Sheets

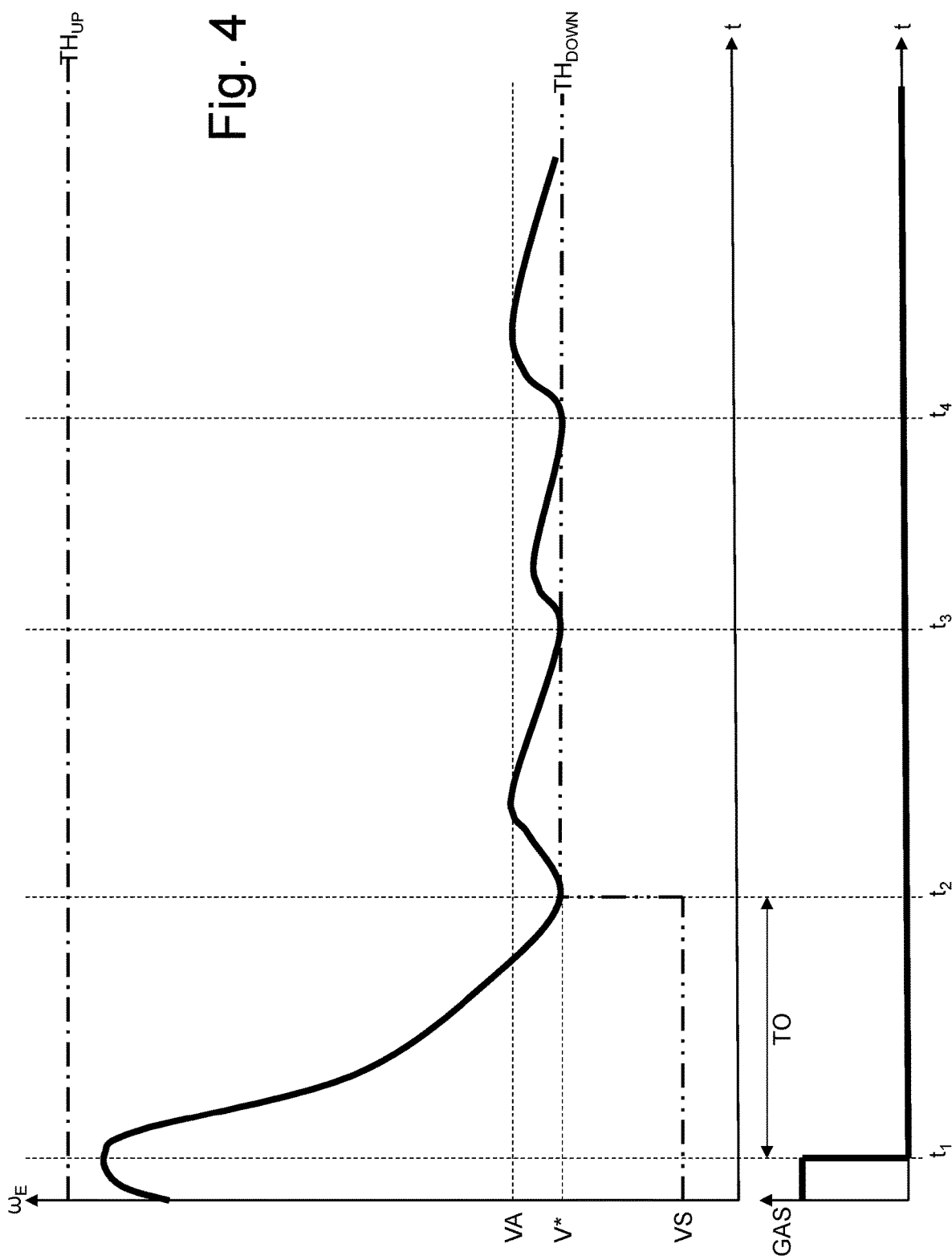

METHOD TO AUTOMATICALLY CONTROL A DRIVETRAIN PROVIDED WITH A SERVO-ASSISTED TRANSMISSION

CROSS-REFERENCE TO RELATED APPLICATIONS

This patent application claims priority from Italian patent application no. 102019000017519 filed on Sep. 30, 2019, the entire disclosure of which is incorporated herein by reference.

TECHNICAL FIELD

The invention relates to a method to automatically control a drivetrain provided with a servo-assisted transmission.

The invention finds advantageous application in a drivetrain provided with a dual-clutch, servo-assisted transmission, to which explicit reference will be made in the description below without because of this loosing in generality.

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

When the drivetrain operates in an automatic mode, namely when the gear shifts are not requested by the driver, but are autonomously decided by the control unit of the drivetrain (simulating the behaviour of an automatic transmission), and when the road vehicle 1 proceeds at a moderate speed (namely, the road vehicle 1 is driven in a non-high-performance mode), "high" gears are generally used in order to allow the internal combustion engine to operate at low speeds (for example, ranging from approximately 1,500 to 3,000 revolutions/minute) so as to minimize fuel consumptions. In these conditions, the control unit of the drivetrain uses a lower threshold and an upper threshold: when the rotation speed of the internal combustion engine is lower than the lower threshold, a downshift is carried out (namely, a new, lower gear is engaged), whereas, when the rotation speed of the internal combustion engine exceeds the upper threshold, an upshift is carried out (namely, a new, higher gear is engaged).

The lower threshold cannot be too close to the upper threshold so as to avoid a sort of "bouncing" between gears: if, during an upshift determined in an automatic manner (namely, because the rotation speed of the internal combustion engine reached the upper threshold), the driver releases the accelerator pedal, the rotation speed of the internal combustion engine can drop so quickly as to meet the lower threshold (if the lower threshold is too close to the upper threshold) before the conclusion of the gear shift and, in this case, the upshift is aborted, thus causing the aforesaid "bouncing" between gears. This gear "bouncing" phenomenon is very annoying and highly undesired and, in order to be avoided, it requires that a given distance is maintained between the lower threshold and the upper threshold.

The upper threshold should be as low as possible so as to reduce the mean rotation speed of the internal combustion engine and, hence, reduce the consumptions of the internal combustion engine; as a consequence, in order to keep the upper threshold low and, at the same time, keep the lower threshold properly far from the upper threshold, the lower threshold has to be set in a neighbourhood of the minimum rpm (namely, the minimum rotation speed of the internal combustion engine, which ensures a regular operation of the internal combustion engine).

However, when the lower threshold is close to the minimum rpm, there is an excessive delay in the downshift when the driver releases the accelerator pedal while the rotation speed of the internal combustion engine is high; assuming, by way of example, that in the servo-assisted transmission there is engaged a high gear and the internal combustion engine is running at 3,000 revolutions/minute: when the accelerator pedal is released, a long time is needed to decelerate the internal combustion engine until it reaches the lower threshold (close to the minimum rpm) and this waiting time could turn out to be "uselessly" too long, thus giving the driver the impression of an excessive slowness in the response of the road vehicle.

U.S. Pat. No. 8,406,968B2 describes a method to automatically control a drivetrain provided with a servo-assisted transmission. The control method entails carrying out a downshift in an autonomous manner and independently of an intervention of a driver, when the rotation speed of the internal combustion engine reaches a lower threshold, and carrying out an upshift in an autonomous manner and independently of an intervention of the driver, when the rotation speed of the internal combustion engine reaches an upper threshold.

DESCRIPTION OF THE INVENTION

The object of the invention is to provide a method to automatically control a drivetrain provided with a servo-assisted transmission, said method not suffering from the drawbacks discussed above and, at the same time, being easy and economic to be implemented.

According to the invention there is provided a method to automatically control a drivetrain provided with a servo-assisted transmission, according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein:

FIGS. 3 and 4 show, according to two different embodiments, the time development of the rotation speed of an internal combustion engine during the execution of some downshifts following the release of the accelerator pedal.

PREFERRED EMBODIMENTS OF THE INVENTION

Figure 1:
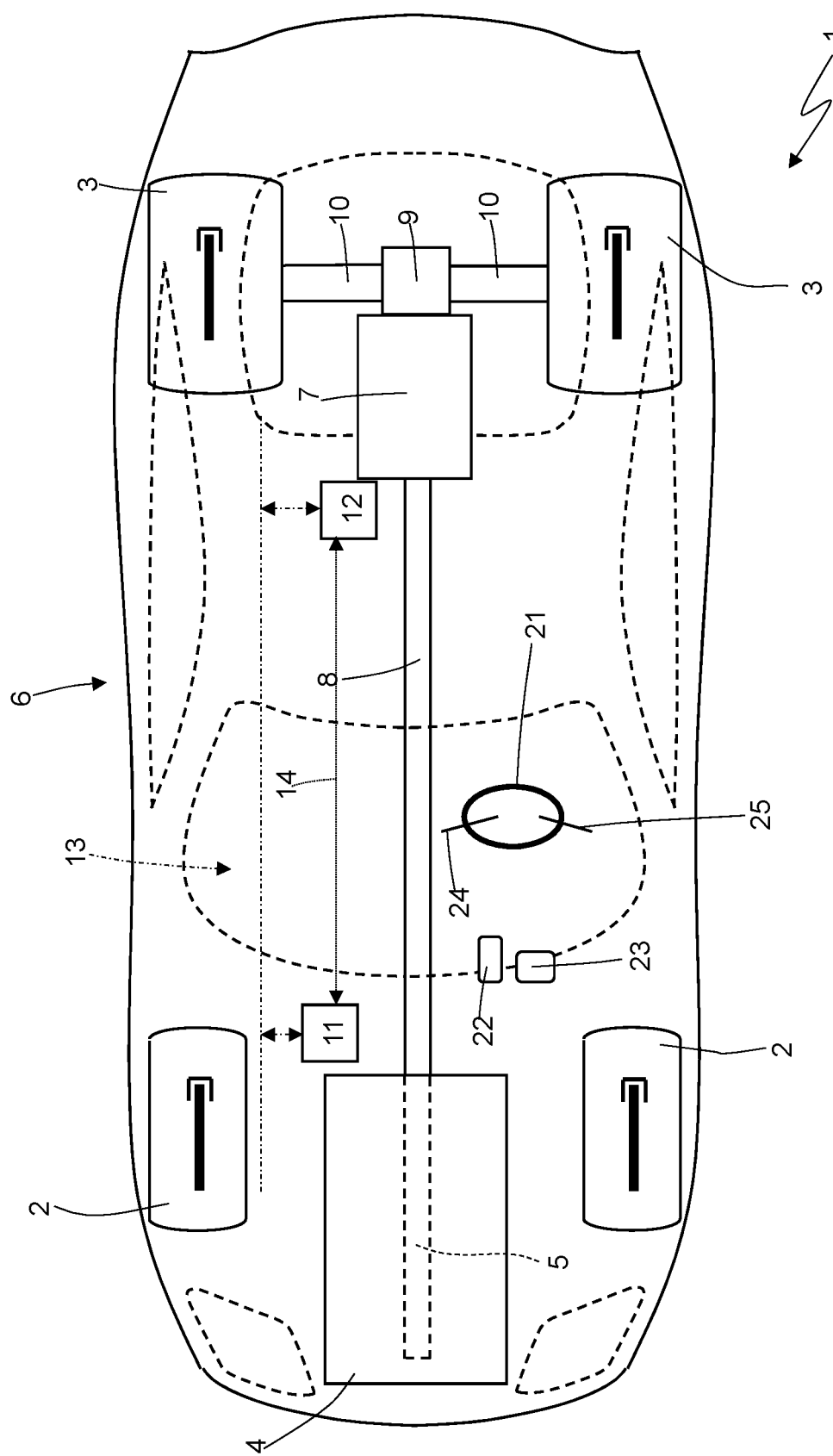
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the engine 4, which controls the engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the engine 4 and the control unit 12 of the drivetrain 6 are connected to the BUS line 13 and, therefore, can communicate with one another by means of messages sent through the BUS line 13. Furthermore, the control unit 11 of the engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the engine 4 without the delays caused by the BUS line 13. Alternatively, the synchronization cable 14 could be absent and all communications between the two control units 11 and 12 could be exchanged using the BUS line 13.

Figure 2:
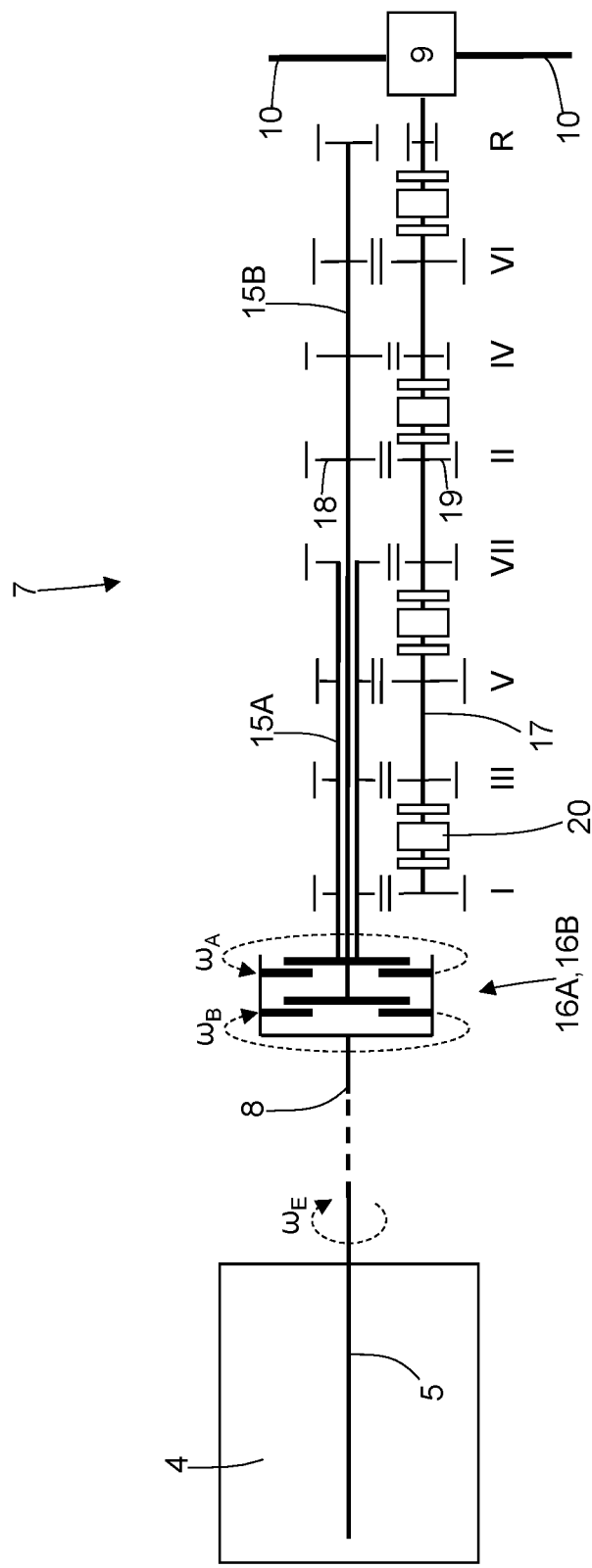
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

In use, the drivetrain 6 can operate in an automatic mode, namely the gear shifts are not requested by the driver through the paddle shifters 24 and 25, but are autonomously decided by the control unit 12 of the drivetrain 6 (simulating the behaviour of an automatic transmission). According to FIG. 3, when the drivetrain 6 operates in an automatic mode, the control unit 12 of the drivetrain 6 uses a lower threshold $TH_{DOWN}$ and an upper threshold $TH_{UP}$: when the rotation speed $\omega_E$ of the internal combustion engine 4 falls below the lower threshold $TH_{DOWN}$, a downshift is carried out (namely, a new, lower gear is engaged) (in an autonomous manner and independently of an intervention of the driver), whereas, when the rotation speed $\omega_E$ of the internal combustion engine 4 exceeds the upper threshold $TH_{UP}$, an upshift is carried out (namely, a new, higher gear is engaged) (in an autonomous manner and independently of an intervention of a driver).

Furthermore, the control unit 12 of the drivetrain 6 detects a release of the accelerator pedal 22 in an instant $t_1$ (namely, the driver releases the accelerator pedal 22 in the instant $t_1$) and waits, starting from the instant $t_1$, a time interval TO (generally having a duration of some seconds, for example the time interval TO could last 2-6 seconds) until a second instant $t_2$, which is subsequent to the instant $t_1$ (and separated from the instant $t_1$ by the time interval TO); finally, in the instant $t_2$, the control unit 12 of the drivetrain 6 increases the value of the lower threshold $TH_{DOWN}$ until a following pressing of the accelerator pedal 22 (if in the second instant $t_2$ the rotation speed $\omega_E$ of the internal combustion engine 4 still exceeds the lower threshold $TH_{DOWN}$, but, generally speaking, this condition is always met as the duration of the time interval TO is chosen so that it is not long enough to provoke a great slowing-down of the road vehicle 1). Namely, the lower threshold $TH_{DOWN}$ has a standard value (shown lower in FIG. 3) before the instant $t_2$ and has an increased value VA (shown higher in FIG. 3), which is higher than the standard value VS, after the instant $t_2$; by way of example, the standard value VS could be equal to 850-950 revolutions/minute, whereas the increased value could be equal to 1,400-1,600 revolutions/minute.

The lower threshold $TH_{DOWN}$ is decreased and takes on again the standard value VS after a following pressing of the accelerator pedal 22; namely, a following pressing of the accelerator pedal 22 "resets" the lower threshold $TH_{DOWN}$, which goes back to having the standard value.

According to a preferred embodiment, if in the instant $t_2$ the rotation speed $\omega_E$ of the internal combustion engine 4 is greater than or equal to the increased value VA, in the instant $t_2$ the lower threshold $TH_{DOWN}$ is brought to the increased value VA (according to FIG. 3); on the other hand, if in the instant $t_2$ the rotation speed $\omega_E$ of the internal combustion engine 4 is smaller than the increased value VA, in the instant $t_2$ the lower threshold $TH_{DOWN}$ is brought to an extemporaneous value V* equal to the rotation speed $\omega_E$ of the internal combustion engine 4 in the second instant $t_2$ (according to FIG. 4) and, therefore, the extemporaneous value V* of the lower threshold $TH_{DOWN}$ is smaller than the increased value VA (in this case, again, a following pressing of the accelerator pedal 22 "resets" the lower threshold $TH_{DOWN}$, which goes back to having the standard value.

According to a preferred embodiment, the duration of the time interval TO is variable and is preferably variable depending on a pressing of the brake pedal 23; namely, the control unit 12 of the drivetrain 6 measures the pressing of the brake pedal 23 (for example, by detecting the pressure of the brake fluid in the hydraulic circuit of the braking system) and changes the duration of the time interval TO based on the pressing of the brake pedal 23. In particular, the duration of the time interval TO is reduced as the pressing of the brake pedal 23 increases, namely the greater the pressing of the brake pedal 23, the shorter the duration of the time interval TO.

As already mentioned above, the duration of the time interval TO is chose so that it is not long enough to provoke a great slowing-down of the road vehicle 1 and, therefore, so that in the instant $t_2$ (i.e. after the time interval TO has elapsed since the instant $t_1$ in which the accelerator pedal 22 was released) the rotation speed $\omega_E$ of the internal combustion engine 4 still exceeds the lower threshold $TH_{DOWN}$ and, hence, no downshift has been carried out yet since the instant $t_1$ in which the accelerator pedal 22 was released.

Figure 3:
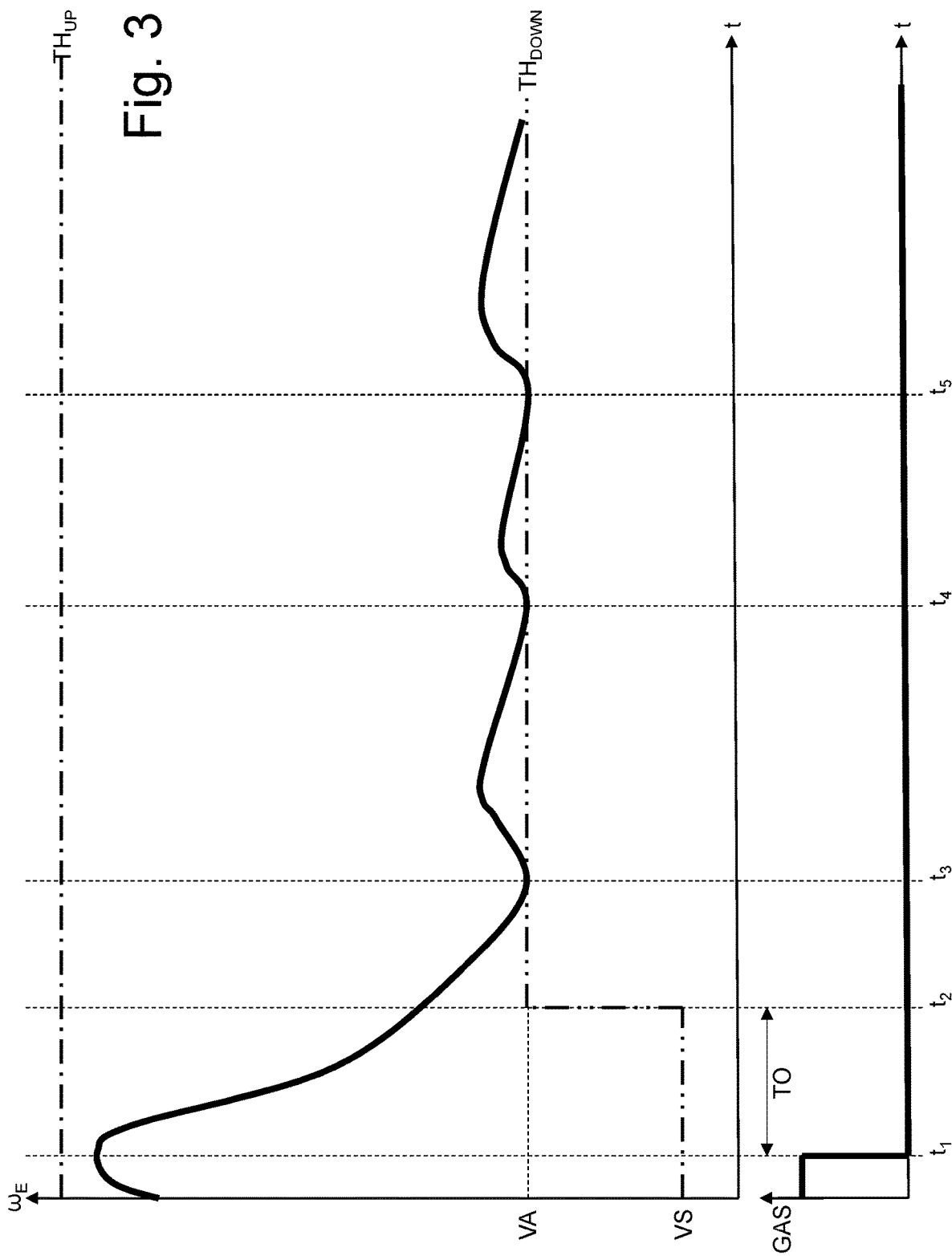

According to FIG. 3, until the instant $t_1$ the accelerator pedal 22 is pressed (see the lower diagram, which shows the position GAS of the accelerator pedal 22) and, therefore, the rotation speed $\omega_E$ of the internal combustion engine 4 increases until the instant $t_1$. In the instant $t_1$ the accelerator pedal 22 is released, then the control unit 12 of the drivetrain 6 waits, starting from the instant $t_1$, the time interval TO until the instant $t_2$ in which the value of the lower threshold $TH_{DOWN}$ is increased. In the following instants $t_3$, $t_4$ and is downshifts are automatically carried out each time the rotation speed $\omega_E$ of the internal combustion engine 4 reaches the lower threshold $TH_{DOWN}$ (equal to the increased value VA). It should be pointed out that the lower threshold $TH_{DOWN}$ is equal to the standard value VS until the instant $t_2$ and is equal to the increased value VA after the instant $t_2$. If after the instant is the accelerator pedal 22 were pressed again, the lower threshold $TH_{DOWN}$ would go back to the standard value VS.

According to FIG. 4, until the instant $t_1$ the accelerator pedal 22 is pressed (see the lower diagram, which shows the position GAS of the accelerator pedal 22) and, therefore, the rotation speed $\omega_E$ of the internal combustion engine 4 increases until the instant $t_1$. In the instant $t_1$ the accelerator pedal 22 is released, then the control unit 12 of the drivetrain 6 waits, starting from the instant $t_1$, the time interval TO until the instant $t_2$ in which the value of the lower threshold $TH_{DOWN}$ is increased; in the instant $t_2$ the rotation speed $\omega_E$ of the internal combustion engine 4 is smaller than the increased value and, therefore, in the instant $t_2$ the lower threshold $TH_{DOWN}$ is brought to the extemporaneous value V*, which is equal to the rotation speed $\omega_E$ of the internal combustion engine 4 in the instant $t_2$ (and, hence, the extemporaneous value V* of the lower threshold $TH_{DOWN}$ is smaller than the increased value VA). As a result, a downshift is automatically carried out in the instant $t_2$ (since the lower threshold $TH_{DOWN}$ is equal to the rotation speed $\omega_E$ of the internal combustion engine 4 in the instant $t_2$). In the following instants $t_3$ and $t_4$ downshifts are automatically carried out each time the rotation speed $\omega_E$ of the internal combustion engine 4 reaches the lower threshold $TH_{DOWN}$ (equal to the extemporaneous value V* and smaller than the increased value VA). It should be pointed out that the lower threshold $TH_{DOWN}$ is equal to the standard value VS until the instant $t_2$ and is greater (even though smaller than the increased value VA) after the instant $t_2$. If after the instant $t_4$ the accelerator pedal 22 were pressed again, the lower threshold $TH_{DOWN}$ would go back to the standard value VS.

What disclosed above can be applied, with no significant changes, even when the drivetrain 6 of the road vehicle 1 is provided with a single-clutch, servo-assisted transmission.

The control method described above has different advantages.

First of all, the control method described above allows the threshold $THD_{DOWN}$ to be maintained very low (close to the minimum rpm), though avoiding the aforesaid "bouncing" between gears when the driver releases the accelerator pedal 22; indeed, the control method described above increases the lower threshold $THD_{DOWN}$ only when needed in order to avoid, by so doing, the aforesaid "bouncing" between gears when the driver releases the accelerator pedal 22.

Furthermore, the control method described above controls the dual-clutch, servo-assisted transmission 7 in ways that are generally appreciated by drivers, who deem them to be "natural" (namely, corresponding to the drivers' expectations).

Finally, the control method described above is easy and economic to be implemented as its execution requires a limited memory space and a reduced calculation ability.

LIST OF THE REFERENCE NUMBERS OF THE FIGURES 1 road vehicle
2 front wheels
3 rear wheels 4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers
21 steering wheel
22 accelerator pedal
23 brake pedal
24 upshift paddle shifter
25 downshift paddle shifter
$\omega_E$ rotation speed
$\omega_A$ rotation speed
$\omega_B$ rotation speed
$t_1$ time instant
$t_2$ time instant
$t_3$ time instant
$t_4$ time instant
$t_5$ time instant
TO time interval
GAS position of the accelerator pedal
$TH_{DOWN}$ lower threshold
$TH_{UP}$ upper threshold
VS standard value
VA increased value
V* extemporaneous value

The invention claimed is:

1. A method to automatically control a drivetrain (6) provided with a servo-assisted transmission (7); the control method comprises the steps of:
    measuring a rotation speed ($\omega_E$) of an internal combustion engine (4);
    carrying out a downshift to a lower gear in an autonomous manner and independently of an intervention of a driver, when the rotation speed ($\omega_E$) of the internal combustion engine (4) reaches a lower threshold ($TH_{DOWN}$);
    carrying out an upshift to a higher gear in an autonomous manner and independently of an intervention of the driver, when the rotation speed ($\omega_E$) of the internal combustion engine (4) reaches an upper threshold ($TH_{UP}$);
    detecting a release of an accelerator pedal (22) in a first instant ($t_1$);
    waiting, starting from the first instant (t1), a time interval (TO) until a second instant ($t_2$), which is subsequent to the first instant ($t_1$); and
    increasing a value of the lower threshold ($TH_{DOWN}$) starting from the second instant ($t_2$) until a following pressing of the accelerator pedal (22), if in the second instant ($t_2$) the rotation speed ($\omega_E$) of the internal combustion engine (4) still exceeds the lower threshold ($TH_{DOWN}$).

2. The control method according to claim 1, wherein the lower threshold ($TH_{DOWN}$) has a standard value (VS) before the second instant ($t_2$) and has an increased value (VA), which is greater than the standard value (VS), after the second instant ($t_2$).

3. The control method according to claim 2, wherein the lower threshold ($TH_{DOWN}$) is decreased and assumes the standard value (VS) again after a following pressing of the accelerator pedal (22).

4. The control method according to claim 1, wherein:
    if in the second instant (t2) the rotation speed ($\omega_E$) of the internal combustion engine (4) is greater than or equal to an increased value (VA), in the second instant (t2) the lower threshold ($TH_{DOWN}$) is brought to the increased value (VA); and
    if in the second instant (t2) the rotation speed ($\omega_E$) of the internal combustion engine (4) is smaller than the increased value (VA), in the second instant (t2) the lower threshold ($TH_{DOWN}$) is brought to an extemporaneous value (V*) equal to the rotation speed ($\omega_E$) of the internal combustion engine (4) in the second instant (t2).

5. The control method according to claim 4 and comprising the further step of carrying out, in the second instant ($t_2$), a downshift to a lower gear in an autonomous manner and independently of an intervention of the driver, if in the second instant (t2) the rotation speed ($\omega_E$) of the internal combustion engine (4) is smaller than the increased value (VA).

6. The control method according to claim 1 and comprising the further step of carrying out, in the second instant ($t_2$), a downshift to a lower gear in an autonomous manner and independently of an intervention of the driver, if in the second instant ($t_2$) the rotation speed ($\omega_E$) of the internal combustion engine (4) is smaller than the increased value (VA).

7. The control method according to claim 1, wherein a duration of the time interval (TO) is variable.

8. The control method according to claim 1 and comprising the further steps of:
    measuring a pressing of a brake pedal (23); and
    changing a duration of the time interval (TO) based on the pressing of a brake pedal (23).

9. The control method according to claim 8, wherein the duration of the time interval (TO) is reduced as the pressing of the brake pedal (23) increases.

10. The control method according to claim 1, wherein the duration of the time interval (TO) is chosen in such a way that in the second instant ($t_2$) the rotation speed ($\omega_E$) of the internal combustion engine (4) still exceeds the lower threshold ($TH_{DOWN}$) and, hence, no downshift to a lower gear has been carried out yet since the first instant ($t_1$).

* * * * *